United States Patent Office 3,314,965
Patented Apr. 18, 1967

3,314,965
11- OR 12-AMINO SUBSTITUTED QUINOLIZINES
Robert J. Stanaback, Morristown, Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Aug. 25, 1965, Ser. No. 482,607
4 Claims. (Cl. 260—288)

This application is a continuation-in-part of application Ser. No. 451,306, filed Apr. 27, 1965.

This invention relates to novel 11- or 12-amino substituted quinolizines of the formula:

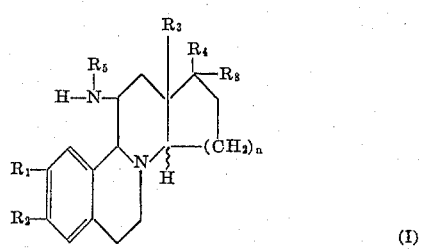

(I)

wherein $R_1$ and $R_2$ may be hydrogen, hydroxy or lower alkoxy of 1 to 6 carbon atoms such as methoxy, ethoxy, propoxy, isopropoxy and the like or $R_1$ and $R_2$ taken together from a methylene dioxy group; $R_3$ may be hydrogen or lower alkyl of 1 to 6 carbon atoms such as methyl, ethyl, propyl and the like; $R_4$ may be hydrogen, $-COOR_6$ or

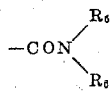

in which $R_6$ may be hydrogen or lower alkyl of 1 to 6 carbon atoms, acetyl or substituted acetyl such as

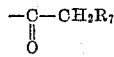

in which $R_7$ may be hydroxy or acyloxy of 1 to 6 carbon atoms such as formyloxy, acetoxy and the like; $R_5$ may be hydrogen or an acyl or aroyl radical such as acetyl, propionyl, benzoyl and the like; $R_8$ may be hydrogen, hydroxy or an acyloxy group of 1 to 6 carbon atoms such as formyloxy, acetoxy, and the like, or $R_4$ and $R_8$ taken together with the carbon atom to which they are attracted form a keto or cyclic ketal group, and $n$ is an integer of from 1 to 2.

The compounds of this invention when $n=2$ have the following numbering system:

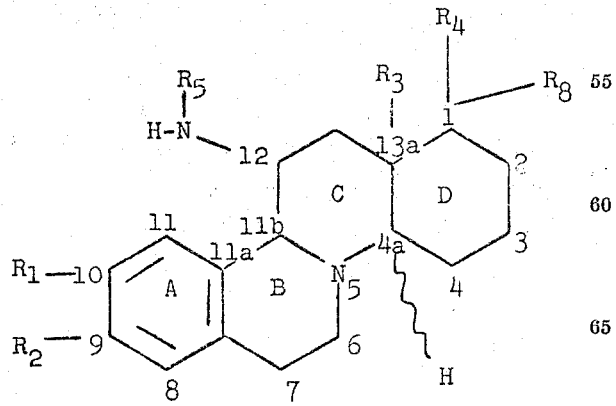

and when $n=1$ the numbering is as follows:

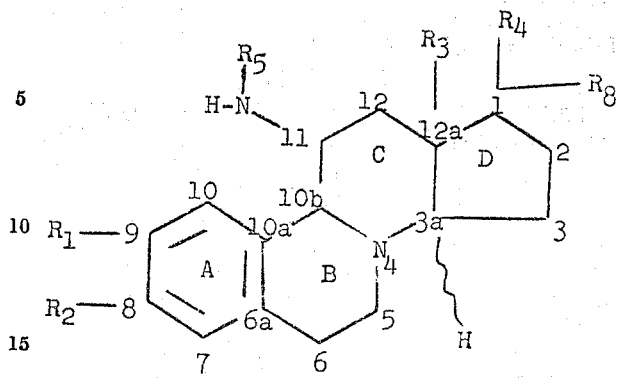

The compounds of this invention exhibit significant pharmacological activity. For example, they are useful as cardiovascular agents, anti-inflammatory agents and for use in steroid therapy. In use, these compounds are combined with a non-toxic inert pharmaceutical carrier to form dosage forms such as tablets, capsules, elixirs, suppositories, suspensions, dispersible powders, and the like, the active ingredient being present in an amount from about 1 to 500 mg. per dosage unit.

These compounds may also be combined with other known therapeutic agents such as analgesics, for example, aspirin, codeine, cardiovascular agents such as pentaerythritoltetranitrate, glyceryltrinitrate, anti-inflammatory agents such as β-methasone-17-valerate or other steroids such as estrogens, progesterone and the like to enhance and broaden their pharmacological spectrum. In addition, the compounds of this invention are useful as starting material for the production of compounds of the formula:

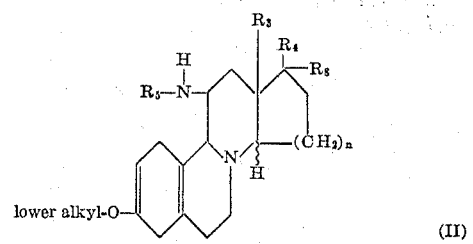

(II)

which may be produced by reaction with sodium in liquid ammonia as described by Birch in J. Chem. Soc. 1944.

The compounds of this invention are prepared by reducing the starting materials of the following formula:

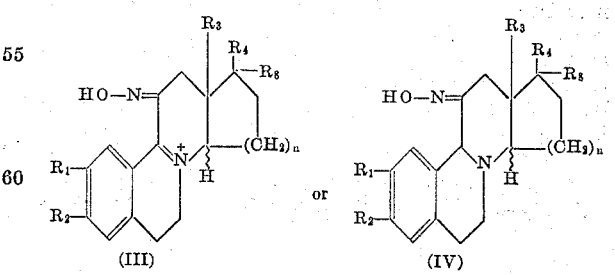

(III)     or     (IV)

These reductions may be effected through the use of gaseous hydrogen in the presence of an inert solvent and a suitable hydrogenation catalyst such as palladium on carbon, or platinum. The reduction may also be effected with a complex metal hydride such as lithium iluminum hydride. When reductions are carried out with those compounds in which there is a free ketone group present these ketone groups are protected by conversion to the corresponding cyclic ketal group through the use of ethylene glycol prior to their reduction. The free ketone group may be restored after the reduction by the use of mild acid hydrolysis.

In order to further illustrate the present invention, the following examples are given:

EXAMPLE 1

*1,2,3,3a,5,6,10b,11,12,12a-decahydro-8-methoxy-11-aminobenz[a]-cyclopenta[f]quinolizine dihydrobromide*

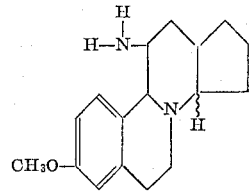

A solution of 5.0 g. of 2,3,3a,5,6,11,12,12a-octahydro-8-methoxy-11-keto-1H - benz[a]cyclopenta[f]quinolizinum chloride oxime in 100 ml. of acetic acid is hydrogenated over 0.1 g. of PtO$_2$ catalyst at ambient temperature and 50 p.s.i. hydrogen pressure. Hydrogen absorption is complete after shaking for about 24 hours. The catalyst is removed by filtration. The solvent is removed by distillation under reduced pressure. The gummy residue is dissolved in water and the solution is made basic by the addition of 20% sodium hydroxide solution. The precipitated bas is extracted with methylene chloride. The solution is dried and concentrated to a semi-solid. The base is taken up in 100 ml. of methanol and dry hydrogen bromide is added. The solution is concentrated to dryness to give 1,2,3,3a,5,6,10b,11,12,12a-decahydro - 8 - methoxy-11-aminobenz[a] - cyclopenta [f]quinolizine dihydrobromide as a white solid, M.P. 278–81° after recrystallization from ethanol.

EXAMPLE 2

*1,2,3,3a,5,6,10b,11,12,12a - decahydro - 8 - methoxy-11-amino-12a - methyl - 1 - carbethoxybenz[a]cyclopenta [f]quinolizine dihydrobromide*

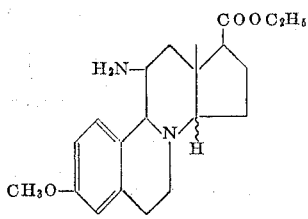

A solution of 0.5 g. of 1,2,3a,5,6,10b,11,12,12a-decahydro-8-methoxy - 11 - keto - 12a-methyl-1-carbethoxybenz[a]cyclopenta[f]quinolizine oxime in 50 ml. of acetic acid containing 0.17 ml. of 72% perchloric acid is hydrogenated over 0.5 g. of PtO$_2$ catalyst at ambient temperature and 50 p.s.i. hydrogen pressure. Hydrogen absorption stops after about 3 hours. The catalyst is removed by filtration. The solvent is removed by distillation under reduced pressure. The residue is taken up in water and made basic by the addition of 20% sodium hydroxide solution. The precipitated base is extracted with ethyl acetate. The organic phase is dried, and dry hydrogen bromide is passed in. The precipitate is collected and recrystallized from ethanol to give 1,2,3,3a,5,6,10b,11,12,12a-decahydro - 8 - methoxy - 11-amino-12a - methyl-1 - carbethoxybenz[a]cyclopenta[f]quinolizine dihydrobromide as white crystals, M.P. 243–6°.

EXAMPLE 3

*1,2,3,3a,5,6,10b,11,12,12a - decahydro - 8 - methoxy-11-amino-12a - methyl - 1 - carbethoxybenz[a]cyclopenta [f]quinolizine dihydrobromide*

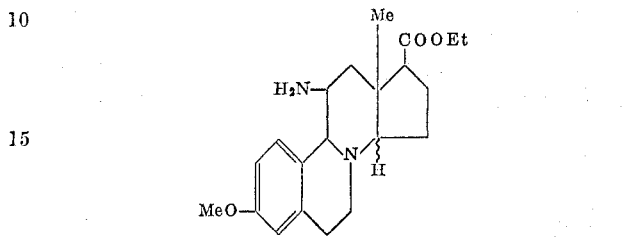

In the same way as described in Example 2, reduction of 0.5 g. of 2,3,3a,5,6,11,12,12a-octahydro - 8 - methoxy-11-keto-12a-methyl-1-carbethoxy - 1H - benz[a]cyclopenta[f]quinolizinium perchlorate oxime gives 1,2,3,3a,5,6,10b,11,12,12a - decahydro - 8 - methoxy - 11-amino-12a - methyl - 1-carbethoxybenz[a]cyclopenta[f]quinolizine dihydrobromide as white crystals, M.P. 243–6° after recrystallization from ethanol.

It is to be understood that the foregoing detailed description is given merely by way of illustration and that many variations may be made therein without departing from the spirit of our invention.

Having described our invention, what we desire to secure by Letters Patent is:

1. A compound of the formula:

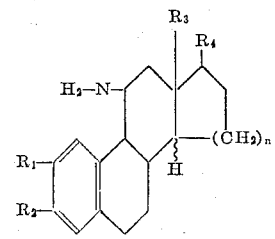

wherein R$_1$ and R$_2$ are each a member of the group consisting of hydrogen, hydroxy, lower alkoxy and R$_1$ and R$_2$ taken together form a methylene dioxy group; R$_3$ is a member of the group consisting of hydrogen methyl and ethyl; R$_4$ is a member of the group consisting of hydrogen, —COOR$_6$, in which R$_6$ is a member of the group consisting of lower alkyl and $n$ is an integer of from 1 to 2.

2. 1,2,3,3a,5,6,10b,11,12,12a-decahydro - 8 - methoxy-11-amino-benz[a]cyclopenta[f]quinolizine.

3. 1,2,3,3a,5,6,10b,11,12,12a-decahydro-8-methoxy-11-aminobenz[a]cyclopenta[f]quinolizine dihydrobromide.

4. 1,2,3,3a,5,6,10b,11,12,12a-decahydro-8-methoxy-11-amino - 12a - methyl-1-carbethoxybenz[a]cyclopenta[f] quinolizine dihydrobromide.

References Cited by the Examiner

UNITED STATES PATENTS 2,982,775   5/1961   Oliveto et al. _____ 260—397.45

ALEX MAZEL, *Primary Examiner.*

DONALD G. DAUS, *Assistant Examiner.*